United States Patent
Loccufier et al.

(10) Patent No.: US 9,156,989 B2
(45) Date of Patent: Oct. 13, 2015

(54) SURFACE MODIFIED PIGMENTS AND NON-AQUEOUS INKS THEREWITH

(71) Applicant: Agfa Graphics NV, Mortsel (BE)

(72) Inventors: Johan Loccufier, Mortsel (BE); Nicolas Vriamont, Mortsel (BE); Paul Callant, Mortsel (BE)

(73) Assignee: Agfa Graphics NV, Mortsel (BE)

( * ) Notice: Subject to any disclaimer, the term of this patent is extended or adjusted under 35 U.S.C. 154(b) by 0 days.

(21) Appl. No.: 14/360,023

(22) PCT Filed: Nov. 21, 2012

(86) PCT No.: PCT/EP2012/073145
§ 371 (c)(1),
(2) Date: May 22, 2014

(87) PCT Pub. No.: WO2013/087376
PCT Pub. Date: Jun. 20, 2013

(65) Prior Publication Data
US 2014/0326164 A1    Nov. 6, 2014

Related U.S. Application Data

(60) Provisional application No. 61/577,100, filed on Dec. 19, 2011.

(30) Foreign Application Priority Data

Dec. 14, 2011 (EP) ........................... 11193407

(51) Int. Cl.
*C09D 11/02* (2014.01)
*C09B 67/00* (2006.01)
*C09D 11/101* (2014.01)
*C09D 11/322* (2014.01)

(52) U.S. Cl.
CPC .......... *C09B 68/4257* (2013.01); *C09D 11/101* (2013.01); *C09D 11/322* (2013.01)

(58) Field of Classification Search
CPC ............................. C09D 11/36; C09D 11/101
See application file for complete search history.

(56) References Cited

U.S. PATENT DOCUMENTS

| | | |
|---|---|---|
| 3,528,840 A | 9/1970 | Aboytes |
| 4,652,435 A | 3/1987 | Natsuume et al. |
| 5,837,045 A | 11/1998 | Johnson et al. |
| 5,851,280 A | 12/1998 | Belmont et al. |
| 6,264,733 B1 | 7/2001 | Bäbler |
| 6,831,194 B2 | 12/2004 | Srinivas |
| 2003/0134938 A1 | 7/2003 | Nakamura et al. |
| 2009/0050014 A1 | 2/2009 | Sujeeth et al. |

FOREIGN PATENT DOCUMENTS

| | | |
|---|---|---|
| EP | 0 997 508 A1 | 5/2000 |
| EP | 2 316 886 A1 | 5/2011 |
| JP | 07-331101 A | 12/1995 |
| WO | 2004/094534 A1 | 11/2004 |
| WO | 2007/006634 A2 | 1/2007 |
| WO | 2007/006635 A2 | 1/2007 |
| WO | 2007/006636 A2 | 1/2007 |
| WO | 2007/006637 A2 | 1/2007 |
| WO | 2007/006638 A2 | 1/2007 |
| WO | 2007/006639 A2 | 1/2007 |
| WO | 2007/060254 A2 | 5/2007 |
| WO | 2007/060255 A2 | 5/2007 |
| WO | 2007/060259 A2 | 5/2007 |
| WO | 2007/060264 A2 | 5/2007 |
| WO | 2007/060265 A2 | 5/2007 |
| WO | 2007/089859 A1 | 8/2007 |
| WO | 2008/034472 A1 | 3/2008 |

OTHER PUBLICATIONS

Official Communication issued in International Patent Application No. PCT/EP2012/073145, mailed on Feb. 4, 2013.

*Primary Examiner* — Veronica F Faison
(74) *Attorney, Agent, or Firm* — Keating & Bennett, LLP

(57) ABSTRACT

A method for preparing a surface modified organic pigment includes the steps of a) reacting the organic pigment in an aromatic hydrocarbon solvent with a surface modifying reagent to form a surface modified organic pigment; and b) washing and drying the surface modified organic pigment; wherein the surface modifying reagent is represented by Formula (I):

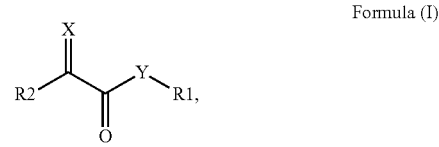

Formula (I)

wherein,
X is selected from the group consisting of O, S and N—R3; Y is selected from the group consisting of —O—, and NR4; R1 to R4 are each independently selected from the group consisting of hydrogen, an alkyl group, an alkenyl group, an alkynyl group, a -aralkyl group, an alkaryl group, and an aryl group and s heteroaryl group; with the proviso that when Y—R1 is different from OH that at least one of R2 to R4 is substituted by at least one functional group having a pKa between 2.5 and 9.

15 Claims, No Drawings

SURFACE MODIFIED PIGMENTS AND NON-AQUEOUS INKS THEREWITH

CROSS-REFERENCE TO RELATED APPLICATIONS

This application is a 371 National Stage application of PCT/EP2012/073145, filed Nov. 21, 2012. This application claims the benefit of U.S. Provisional Application No. 61/577,100, filed Dec. 19, 2011, which is incorporated by reference herein in its entirety. In addition, this application claims the benefit of European Application No. 11193407.1, filed Dec. 14, 2011, which is also incorporated by reference herein in its entirety.

BACKGROUND OF THE INVENTION

1. Field of the Invention

The present invention relates to a new class of surface modified organic pigments, a process for their preparation and non-aqueous inks including at least one such surface modified pigment.

2. Description of the Related Art

In industrial ink jet systems, there is a constant demand for increased printing speeds in combination with high image quality. This requires an excellent dispersion quality and stability of the inks in order to guarantee continuous printing without production loss due to nozzle or engine failures. The new print heads designed for increasing printing speed only operate with very low viscous inkjet inks which generally exhibit inferior shelf life stability. In addition, the reduction of pigment particle size for image quality also tends to result in more critical shelf life stability.

Polymeric dispersants are substances for promoting the formation and stabilization of a dispersion of pigment particles in a dispersion medium. They typically contain in one part of the molecule so-called anchor groups, which adsorb onto the pigments to be dispersed. In a spatially separate part of the molecule, polymeric dispersants have polymer chains compatible with the dispersion medium, thus stabilizing the pigment particles in the dispersion medium.

In aqueous pigment dispersions, the polymeric dispersants generally contain hydrophobic anchor groups exhibiting a high affinity for the pigment surface and hydrophilic polymer chains for stabilizing the pigments in the aqueous dispersion medium. Thermally stable non-aqueous dispersions with submicron particles are much more difficult to prepare, especially for pigments having a non-polar surface.

Several methods to improve the dispersibility of organic pigments are disclosed in The Chemistry of Inkjet Inks. Edited by MAGDASSI, Shlomo. Singapore: World Scientific Publishing Co., 2010. p. 111-119.

Often commercially available polymeric dispersants are used as general purpose dispersants for all pigment types. However, it is known in the art that several pigments cannot be milled down to the required particle size for high end ink jet applications using only general purpose dispersants. In a first approach to optimize the dispersion quality of these pigments, dedicated dispersants have been designed, containing structural moieties, having a structural similarity with the pigment to be dispersed. Such dispersant designs have been disclosed in WO 2007/089859 (CABOT), WO 2007/006634 (AGFA), WO 2007/006635 (AGFA), WO 2007/006636 (AGFA), WO 2007/006637 (AGFA), WO 2007/006638 (AGFA) and WO 2007/006639 (AGFA). However this approach, though very effective, requires the design of a dedicated dispersant for each class of pigments, leading to high costs making this approach less attractive from an economical and industrial point of view.

In a second approach, so called dispersion synergists have been developed to improve the dispersibility of specific pigments in combination with general purpose dispersants. Dispersion synergists are especially useful to disperse pigments with a hydrophobic surface in a non-aqueous dispersion medium by modifying the pigment surface to a hydrophilic surface. Several dispersion synergists have been commercialized, such as Solsperse™ 5000 from Lubrizol. WO 2007/060254 (AGFA) discloses quinacridone derivatives having carboxylic acid groups for modifying the surface of quinacridone pigments. Other dispersion synergists are disclosed in WO 2007/060255 (AGFA), WO 2007/060259 (AGFA), WO 2007/060264 (AGFA), WO 2007/060265 (AGFA) and WO 2007/060265 (AGFA). As dispersion synergists generally show a certain molecular similarity with the pigments to be dispersed, this approach also requires the development of a specific dispersion synergist for each pigment class, leading again to a high additional cost and an economically less attractive option.

In a third approach, the pigment surface is modified by direct chemical reaction introducing polar or acid groups on the pigment surface, which should enhance the interaction with the dispersants used in the milling process.

Diazonium technology has been successfully used both on carbon black and different organic pigments to introduce functional groups as disclosed in U.S. Pat. No. 5,851,280 (CABOT) and U.S. Pat. No. 5,837,045 (CABOT). However, this technology requires an aqueous environment, making it difficult to extend the technology to solvent based and UV based inks.

Surface sulfonation has been disclosed in U.S. Pat. No. 3,528,840 (HUBER), US 2003134938 (DAINICHISEIKA COLOR) and EP 2316886 A (AGFA). Sulfonation leads to highly acidic pigment surfaces, which are incompatible with cationic radiation curable formulations or vinyl ether containing free radical radiation curable formulations, unless specific precautions are taken. Vinyl ethers, such as vinylether acrylates disclosed by EP 997508 A (AGFA), are of special interest for preparing low viscous radiation curable ink jet inks suitable for the new print heads designed for increasing printing speed.

Therefore, it would be advantageous to design carboxylation technology for surface modification of organic pigments, making the modified pigments compatible with vinyl ether containing radiation curable formulations by design.

Surface carboxylation through hydrolysis has been disclosed in WO 2008/034472 (AGFA) and WO 2004/094534 (CABOT). However, this technology is restricted to organic pigments comprising hydrolysable groups in their structure. Several industrially interesting pigment classes cannot be surface modified using this technology.

U.S. Pat. No. 6,264,733 (CIBA) discloses surface modification with a formaldehyde precursor in combination with aromatic carboxylic acids in a strong acidic medium. Strong acids are not easy to remove from pigments filter cakes by washing. Traces of strong acid catalysts render the pigment incompatible with vinyl ether containing radiation curable formulations.

U.S. Pat. No. 6,831,194 (COLUMBIAN CHEMICALS) uses cyclic anhydrides in combination with Lewis acids to introduce gamma keto carboxylic acids on the pigment surface. Also Lewis acids have to be removed to the last trace to render the pigment compatible with vinyl ether containing radiation curable formulations.

Hence there is still a need for carboxylation technology, applicable on a broad range of pigments, without the need for significant amounts of strong acids or Lewis acids as catalysts.

SUMMARY OF THE INVENTION

In order to overcome the problems described above, it has been surprisingly found that a wide range of pigments could be carboxylated using specific acids, such as glyoxylic acid, pyruvic acid, 2-oxobutanoic acid and phenyl glyoxylic acid, without the need for strong acids or Lewis acids as catalysts.

Preferred embodiments of the present invention provide a new class of surface modified organic pigments, having an improved dispersion quality and stability, especially in non-aqueous (inkjet) inks.

Other preferred embodiments of the present invention provide a simple synthetic process for the preparation of the surface modified organic pigments.

Even further preferred embodiments of the present invention provide highly stable radiation curable (inkjet) inks including at least one surface modified organic pigment according to the preferred embodiments described above, especially vinyl ether containing radiation curable (inkjet) inks.

These and other advantages and benefits will become apparent in the description hereinafter.

DETAILED DESCRIPTION OF THE PREFERRED EMBODIMENTS

Definitions

The term "mixed crystal", which is synonymous for "solid solution", as used in disclosing the present invention, means a solid, homogeneous mixture of two or more constituents, which may vary in composition between certain limits and remain homogeneous. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion as individual pigments. In such physical mixtures, the x-ray pattern of each of the components can be distinguished, and the disappearance of many of these lines is one of the criteria of the formation of solid solutions.

The term "C.I." is used in disclosing the present application as an abbreviation for Colour Index.

Methods for Preparing Surface Modified Organic Pigments

Method for preparing a surface modified organic pigment comprising the steps of:
a) reacting an organic pigment in an aromatic hydrocarbon solvent with a surface modifying reagent to form a surface modified organic pigment; and
b) washing and drying the surface modified organic pigment; wherein the surface modifying reagent is represented by Formula (I):

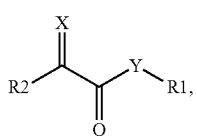

Formula (I)

wherein,

X is selected from the group consisting of O, S and N—R3;

Y is selected from the group consisting of O, NR4;

R1 to R4 are each independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl group and a substituted or unsubstituted heteroaryl group;

with the proviso that when Y—R1 is different from OH that at least one of R2 to R4 is substituted by at least one functional group having a pKa between 2.5 and 9.

Suitable functional groups having a pKa between 2.5 and 9 are carboxylic acids, acyl sulfonamides, sulfonamides, aminocarbonyl sulfoximides, N-cyano-sulfonamide, cyanamide tetrazoles, phenols substituted with electron withdrawing groups, oximes, imidazolidinones, barbituric acid derivatives, heterocyclic thiols, sulfonamides substituted with heterocyclic rings, heterocyclic aromatic rings, aromatic rings and uric acid derivatives without being limited thereto.

In a preferred embodiment the functional group having a pKa between 2.5 and 9 is a carboxylic acid group.

To determine whether the functional group has a pKa between 2.5 and 9, a water soluble compound comprising the functional group is used to measure the pKa according to the following method. The pKa is determined using a combined glass electrode (electrolyte: KCl 3M in water). The potentiometric titration is performed at 25° C. in a thermostatic vessel. The electrode is calibrated at 25° C. using Merck buffers of pH 4, pH 7 and pH 10. An 0.01M aqueous solution of the compound is prepared. This solution is titrated under N2 (nitrogen) atmosphere using a 0.01 M HCl or 0.01 M NaOH titrant. During the titration the solution is stirred using a magnetic stirrer. The Henderson-Hasselbach equation is simplified at the half equivalence point to pH=pKa. This half equivalence point is determined using the first derivative.

The substituted or unsubstituted alkyl group is preferably a $C_1$ to $C_6$-alkyl group.

The substituted or unsubstituted alkenyl group is preferably a $C_1$ to $C_6$-alkenyl group.

The substituted or unsubstituted alkynyl group is preferably a $C_1$ to $C_6$-alkynyl group.

The substituted or unsubstituted aralkyl group is preferably phenyl group or naphthyl group including one, two, three or more $C_1$ to $C_6$-alkyl groups.

The substituted or unsubstituted alkaryl group is preferably a $C_1$ to $C_6$-alkyl group including a phenyl group or naphthyl group.

The substituted or unsubstituted aryl group is preferably a phenyl group or naphthyl group The substituted or unsubstituted heteroaryl group is preferably a five- or six-membered ring substituted by one, two or three oxygen atoms, nitrogen atoms, sulphur atoms, selenium atoms or combinations thereof.

The substituted alkyl group, the substituted alkenyl group, the substituted alkynyl group, the substituted aralkyl group, the substituted alkaryl group, the substituted aryl and the substituted heteroaryl group are preferably substituted by one or more substituents selected from the group consisting of methyl, ethyl, n-propyl, isopropyl, n-butyl, isobutyl and tertiary-butyl, —Cl, —Br, —I, —OH, —CN and —NO$_2$.

In a more preferred embodiment, the surface modifying reagent is represented by Formula (II):

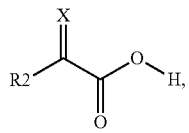

Formula (II)

wherein R2 is defined as above for Formula (I).

In a preferred embodiment, X represents O.

In a preferred embodiment, R2 is selected from the group consisting of hydrogen, a substituted or unsubstituted alkyl group and a substituted or unsubstituted aryl group.

In a more preferred embodiment, R2 is selected from the group consisting of hydrogen and a substituted or unsubstituted alkyl group.

In the most preferred embodiment, R2 represents hydrogen.

Preferred surface modifying reagents are selected from the group consisting of glyoxylic acid, pyruvic acid, 2-oxobutanoic acid and phenyl glyoxylic acid. Suitable surface modifying reagents including a substituted or unsubstituted aryl group include phenylglyoxylic acid and 4-cyanophenylglyoxylic acid.

The surface modified organic pigments according to the present invention are preferably prepared by reacting the surface of the organic pigment with a surface modifying reagent according to Formula (I) or (II) under catalytic acidic conditions.

Catalytic acidic conditions are defined as conditions where the molar ratio of acid catalyst over surface modifying agent is lower then 0.5. In a preferred embodiment, the ratio is lower the 0.4. In a more preferred embodiment, the ratio is lower then 0.3. In a further preferred embodiment the acid catalyst is a Brönsted acid having a pKa lower then 2, lower then 1 being more preferred. In another preferred embodiment, no extra acid catalyst is used.

The method for preparing a surface modified organic pigment preferably uses as reaction medium an aromatic hydrocarbon solvent preferably selected from the group consisting of toluene, o-xylene, m-xylene, p-xylene and mixtures thereof.

The surface modified organic pigment is preferably washed using an aromatic hydrocarbon solvent optionally in combination with a ketone, such as acetone or butanone. The aromatic hydrocarbon solvent for washing the pigment is preferably the same aromatic hydrocarbon solvent used as reaction medium.

In a preferred embodiment, the organic pigment is selected from the group consisting of quinacridone pigments, diketopyrrolopyrrole pigments, quinolonoquinolone pigments, dioxazine pigments, aminoanthraquinone pigments, indanthrone pigments, bisbenzimidazobenzophenanthroline dione pigments and mixed crystals thereof.

In a preferred embodiment, the quinacridone pigment is selected from the group consisting of C.I. Pigment Red 122, 192, 202, 207, 209, C.I Pigment Violet 19 and mixed crystals thereof. Most preferably, the quinacridone pigment is C.I. Pigment Red 122, C.I. Pigment Red 192, C.I. Pigment Red 202, C.I Pigment Violet 19 and a mixed crystal thereof.

In a preferred embodiment, the diketopyrrolopyrrole pigment (DPP) is selected from the group consisting of C.I. Pigment Orange 71, C.I. Pigment Red 254, Pigment Red 255 and a mixed crystal thereof.

In another preferred embodiment, the organic pigment is a DPP/quinacridone solid solution.

In a preferred embodiment, the quinolonoquinolone pigment is selected from the group consisting of C.I. Pigment Yellow 218, C.I. Pigment Yellow 220, C.I. Pigment Yellow 221 and mixed crystals thereof.

In a preferred embodiment, the dioxazine pigment is C.I. Pigment Violet 23.

In a preferred embodiment, the aminoanthraquinone pigment is C.I. Pigment Red 177.

In a preferred embodiment, the indanthrone pigment is C.I. Pigment Blue 60.

In a preferred embodiment, the bisbenzimidazobenzophenanthroline dione pigments is represented by Formula (PB043):

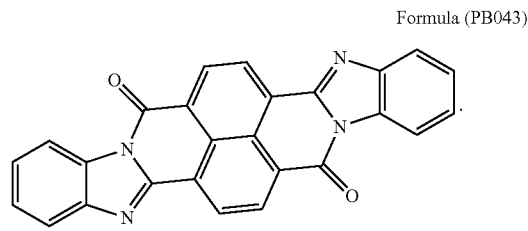 [SMILES: O=c1c2ccc3c4c(ccc(c24)c2nc4ccccc4n12)c(=O)n1c2ccccc2nc31]

Formula (PB043)

Surface Modified Organic Pigments

Preferred embodiments of the present invention include the surface modified organic pigment obtained by above described method for preparing a surface modified organic pigment.

A surface modified organic pigment according to a preferred embodiment of the present invention includes at least one functional group according to Formula (III) attached to its surface:

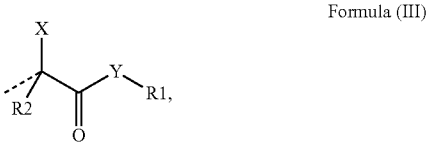

Formula (III)

wherein,
the dashed line represents a covalent bond to one of the pigment molecules at the pigment surface;
X is selected from the group consisting of OR5, SR6, NR3R7 and halogen;
Y is selected from the group consisting of O, NR4;
R1 to R4 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl group, a substituted or unsubstituted heteroaryl group;
R5 to R7 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl group and a substituted or unsubstituted heteroaryl group and a substituted or unsubstituted acyl group;

any one of R1 to R7 may represent the necessary atoms to form a five to eight membered ring with one of the other groups selected from R1 to R7;

with the proviso that when Y—R1 is different from OH that at least one of R2 to R7 is substituted by at least one functional group having a pKa between 2.5 and 9.

Suitable functional groups having a pKa between 2.5 and 9 are carboxylic acids, acyl sulfonamides, sulfonamides, aminocarbonyl sulfoximides, N-cyano-sulfonamide, cyanamide tetrazoles, phenols substituted with electron withdrawing groups, oximes, imidazolidinones, barbituric acid derivatives, heterocyclic thiols, sulfonamides substituted with heterocyclic rings and uric acid derivatives without being limited thereto.

In a preferred embodiment the functional group having a pKa between 2.5 and 9 is a carboxylic acid group.

In a more preferred embodiment, Y represents O and R1 is hydrogen.

In an even further preferred embodiment, X is selected from the group consisting of OR5 and NR3R7, with OR5 being particularly preferred.

In the most preferred embodiment X is a hydroxyl group.

In a further preferred embodiment R2 is selected from the group consisting of hydrogen, a substituted or unsubstituted alkyl group and a substituted or unsubstituted aryl group; more preferably R2 is selected from the group consisting of hydrogen and a substituted or unsubstituted alkyl group and most preferably R2 is hydrogen.

The substituted or unsubstituted alkyl group is preferably a $C_1$ to $C_6$-alkyl group.

The substituted or unsubstituted alkenyl group is preferably a $C_1$ to $C_6$-alkenyl group.

The substituted or unsubstituted alkynyl group is preferably a $C_1$ to $C_6$-alkynyl group.

The substituted or unsubstituted aralkyl group is preferably phenyl group or naphthyl group including one, two, three or more $C_1$ to $C_6$-alkyl groups.

The substituted or unsubstituted alkaryl group is preferably a $C_1$ to $C_6$-alkyl group including a phenyl group or naphthyl group.

The substituted or unsubstituted aryl group is preferably a phenyl group or naphthyl group The substituted or unsubstituted heteroaryl group is preferably a five- or six-membered ring substituted by one, two or three oxygen atoms, nitrogen atoms, sulphur atoms, selenium atoms or combinations thereof.

The substituted or unsubstituted acyl group is preferably a $C_1$ to $C_6$-acyl group.

The substituted alkyl group, the substituted alkenyl group, the substituted alkynyl group, the substituted aralkyl group, the substituted alkaryl group, the substituted aryl, the substituted heteroaryl group and the substituted acyl group are preferably substituted by one or more substituents selected from the group consisting of methyl, ethyl, n-propyl, isopropyl, n-butyl, isobutyl and tertiary-butyl, —Cl, —Br, —I, —OH, —CN and —$NO_2$.

In a preferred embodiment, the one of the pigment molecules at the pigment surface is selected from the group consisting of quinacridone, diketopyrrolopyrrole, quinolonoquinolone, dioxazine, aminoanthraquinone, indanthrone and bisbenzimidazobenzophenanthroline dione.

In a preferred embodiment, the one of the pigment molecules at the pigment surface is a quinacridone selected from the group consisting of C.I. Pigment Red 122, 192, 202, 207, 209, C.I Pigment Violet 19. Most preferably, the quinacridone is C.I. Pigment Red 122, C.I. Pigment Red 192, C.I. Pigment Red 202 and C.I Pigment Violet 19.

In a preferred embodiment, the one of the pigment molecules at the pigment surface is a diketopyrrolopyrrole (DPP) selected from the group consisting of C.I. Pigment Orange 71, C.I. Pigment Red 254 and Pigment Red 255.

In a preferred embodiment, the one of the pigment molecules at the pigment surface is a quinolonoquinolone pigment selected from the group consisting of C.I. Pigment Yellow 218, C.I. Pigment Yellow 220 and C.I. Pigment Yellow 221.

In a preferred embodiment, the dioxazine pigment molecule at the pigment surface is C.I. Pigment Violet 23.

In a preferred embodiment, the aminoanthraquinone pigment molecule at the pigment surface is C.I. Pigment Red 177.

In a preferred embodiment, the indanthrone pigment molecule at the pigment surface is C.I. Pigment Blue 60.

In a preferred embodiment, the bisbenzimidazobenzophenanthroline dione pigment molecule at the pigment surface is represented by Formula (PB043):

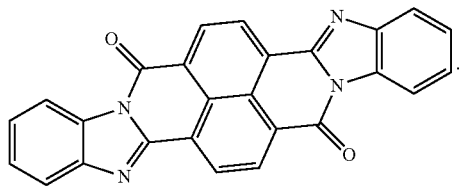

Formula (PB043)

The surface modified pigment is preferably present in the range of 0.05 to 20%, more preferably in the range of 0.1 to 10% by weight and most preferably in the range of 1 to 6% by weight, each based on the total weight of the pigment dispersion or (inkjet) ink.

Non-Aqueous Pigment Dispersions

The surface modified organic pigments according to the present invention can be used in water based, solvent based, oil based and radiation curable formulations and inks. However, the surface modified organic pigments can be advantageously dispersed in non-aqueous pigment dispersions and (inkjet) inks for improving the dispersion quality and stability.

The non-aqueous pigment dispersion or (inkjet) ink includes preferably at least a non-aqueous dispersion medium, a polymeric dispersant and at least one surface modified organic pigment according to the present invention. In a preferred embodiment, the non-aqueous pigment dispersion or (inkjet) ink is curable by UV radiation or e-beam.

The surface modified organic pigments according to the present invention are especially suitable for preparing highly stable radiation curable (inkjet) inks including a polymerizable compound having at least one vinyl ether group. These radiation curable (inkjet) inks can be free radical curable or cationically curable inks. The cationically curable ink includes at least one vinyl ether and preferably one or more epoxides or oxetanes.

In a preferred embodiment, the radiation curable ink is a free radical radiation curable ink including a polymerizable compound having at least one vinyl ether group.

Preferred examples of the vinyl ether compound include monovinyl ether compounds such as ethyl vinyl ether, n-propyl vinyl ether, isopropyl vinyl ether, n-butyl vinyl ether, isobutyl vinyl ether, octadecyl vinyl ether, cyclohexyl vinyl ether, phenyl vinyl ether, hydroxyethyl vinyl ether, hydroxybutyl vinyl ether, 2-ethylhexyl vinyl ether, cyclohexanedimethanol monovinyl ether, isopropenyl ether-O-propylene carbonate, dodecyl vinyl ether, diethyleneglycol monovinyl ether, octadecyl vinyl ether; and the like.

Preferred examples of the vinyl ether compound include multifunctional vinylethers, such as divinyl ethers and trivinyl ethers.

Preferred divinyl ethers including ethylene glycol divinylether, diethylene glycol divinylether, polyethylene glycol divinylether, propylene glycol divinylether, butylene glycol divinylether, hexanediol divinylether, bisphenol A alkyleneoxide divinylethers, and bisphenol F alkyleneoxide divinylethers.

Preferred multifunctional vinyl ethers having more than two vinyl ether groups include trimethylolethane trivinylether, trimethylolpropane trivinylether, ditrimethyrollpropane tetravinylether, glycerol trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethyrollpropane tetravinylether, propyleneoxide adducts of ditrimethyrollpropane tetravinylether, ethyleneoxide adducts of pentaerythritol tetravinylether, propyleneoxide adducts of pentaerythritol tetravinylether, ethyleneoxide adducts of dipentaerythritol hexavinylether, and propyleneoxide adducts of dipentaerythritol hexavinylether, and the like.

Of these vinyl ether compounds, divinyl ether compounds and trivinyl ether compounds are preferred, and divinyl ether compounds are particularly preferred, in view of curability, adhesiveness and surface hardness. The vinyl ether compounds may be used by solely one kind, or as a suitable combination of two or more kinds.

In a radiation curable (inkjet) ink, the divinyl ether compounds and trivinyl ether compounds are preferably present in an amount of at least 20 wt %, more preferably at least 30 wt % and most preferably at least 40 wt % based upon the total weight of the radiation curable composition used in the radiation curable (inkjet) ink.

In a more preferred embodiment, the free radical radiation curable ink includes at least one vinyl ether methacrylate or vinyl ether acrylate, an acrylate being particularly preferred.

The vinylether (meth)acrylate is preferably represented by Formula (V):

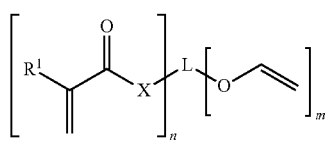

Formula (V)

wherein,
R$^1$ represents hydrogen or a methyl group,
L represents a linking group comprising at least one carbon atom,
X represents O, S or NR$^2$ wherein R$^2$ has the same meaning as R$^1$;
when X=NR$^2$, L and R$^2$ may form together a ring system, and n and m independently represent a value from 1 to 5.

In a preferred embodiment, the compound according to Formula (V) has R$^2$ representing hydrogen, X representing O, and n representing a value of 1. The value of m is preferably 1, 2 or 3. L preferably comprises 2, 3 or 4 carbon atoms.

Preferred vinylether (meth)acrylates are those disclosed in U.S. Pat. No. 6,310,115 (AGFA). Particularly preferred compounds are 2-(2-vinyloxyethoxy)ethyl(meth)acrylate, most preferably the compound is 2-(2-vinyloxyethoxy)ethyl acrylate. Other suitable vinylether (meth)acrylates are those disclosed in columns 3 and 4 of U.S. Pat. No. 6,767,980 (NIPPON CATALYTIC).

A single compound or a mixture of vinylether (meth)acrylates may be used.

In a radiation curable (inkjet) ink, the vinylether acrylate is preferably present in an amount of at least 20 wt %, more preferably at least 30 wt % and most preferably at least 40 wt % based upon the total weight of the radiation curable composition used in the radiation curable (inkjet) ink.

The radiation curable (inkjet) ink is preferably a non-aqueous (inkjet) ink. The term "non-aqueous" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous (inkjet) inks instable, preferably the water content is less than 1 wt % based on the total weight dispersion medium and most preferably no water at all is present.

The radiation curable (inkjet) ink preferably contains a dispersant, more preferably a polymeric dispersant, for dispersing the pigment. The curable ink may contain a dispersion synergist to improve the dispersion quality of the ink. A mixture of dispersion synergists may be used to further improve dispersion stability.

The viscosity of the radiation curable inkjet ink is preferably smaller than 30 mPa·s, more preferably smaller than 15 mPa·s, and most preferably between 1 and 10 mPa·s at 25° C. and at a shear rate of 100 s$^{-1}$. The viscosity of the inkjet ink at the jetting temperature is preferably smaller than 30 mPa·s, more preferably smaller than 15 mPa·s, and most preferably between 1 and 10 mPa·s at a shear rate of 100 s$^{-1}$ and a jetting temperature between 10 and 70° C.

The radiation curable (inkjet) ink may further also contain at least one inhibitor.

The non-aqueous (inkjet) ink forms preferably part of a non-aqueous CMYK (inkjet) ink set. The non-aqueous CMYK (inkjet) ink set may also be extended with extra inks such as red, green, blue, and/or orange to further enlarge the colour gamut of the image. The CMYK (inkjet) ink set may also be extended by the combination of full density and light density inks of both colour inks and/or black inks to improve the image quality by lowered graininess.

Non-Aqueous Dispersion Media

The dispersion medium used in the pigment dispersion according to a preferred embodiment of the present invention is a non-aqueous liquid. The dispersion medium may consist of organic solvent(s), oil(s) or polymerizable compounds or combinations thereof.

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N, N-dimethylformamid may be used.

Preferred examples of organic solvents are disclosed in [0133] to [0146] of EP 1857510 A (AGFA GRAPHICS).

If the pigment dispersion is a curable (inkjet) ink, organic solvent(s) are preferably fully replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the (inkjet) ink and most preferably the curable pigment dispersion or ink doesn't include any organic solvent.

For oil based pigment dispersions and (inkjet) inks the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cycloparaffins (cyclooctane and higher cyclo-alkanes) and mixtures of paraffin oils.

Suitable examples of oils are disclosed in [0151] to of EP 1857510 A (AGFA GRAPHICS).

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS).

Polymeric Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:
   statistically polymerized monomers (e.g. monomers A and B polymerized into ABBAABAB);
   alternating polymerized monomers (e.g. monomers A and B polymerized into ABABABAB);
   gradient (tapered) polymerized monomers (e.g. monomers A and B polymerized into AAABAABBABBB);
   block copolymers (e.g. monomers A and B polymerized into AAAAABBBBBB) wherein the block length of each of the blocks (2, 3, 4, 5 or even more) is important for the dispersion capability of the polymeric dispersant;
   graft copolymers (graft copolymers consist of a polymeric backbone with polymeric side chains attached to the backbone); and
   mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
   DISPERBYK™ dispersants available from BYK CHEMIE GMBH;
   SOLSPERSE™ dispersants available from NOVEON;
   TEGO™ DISPERS™ dispersants from EVONIK;
   EDAPLAN™ dispersants from MÜNZING CHEMIE;
   ETHACRYL™ dispersants from LYONDELL;
   GANEX™ dispersants from ISP;
   DISPEX™ and EFKA™ dispersants from CIBA SPECIALTY CHEMICALS INC;
   DISPONER™ dispersants from DEUCHEM; and
   JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Initiators

The curable (inkjet) ink preferably contains an initiator for initiating the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable (inkjet) ink may be a Norrish type I initiator, a Norrish type II initiator or a photo-acid generator.

Thermal initiator(s) suitable for use in the curable (inkjet) ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane,1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used.

Suitable photo-initiators are disclosed in CRIVELLO, J.V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluorophosphate.

The curable (inkjet) ink may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable (inkjet) ink.

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink in a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Preferred examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluorophosphate.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the curable pigment dispersion or (inkjet) ink.

In order to increase the photosensitivity further, the curable pigment dispersion or ink may additionally contain co-initiators. Suitable examples of co-initiators can be categorized in 3 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate).

The preferred co-initiators are aminobenzoates.

When one or more co-initiators are included into the curable pigment dispersion or (inkjet) ink according to a preferred embodiment of the present invention, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator.

A preferred diffusion hindered co-initiator is a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

A more preferred diffusion hindered co-initiator is one or more polymerizable co-initiators. In a preferred embodiment the polymerizable co-initiator comprises at least one (meth)acrylate group, most preferably at least one acrylate group.

Preferred diffusion hindered co-initiators are the polymerizable co-initiators disclosed in EP 2053101 A (AGFA) in paragraphs [0088] and [0097].

The curable pigment dispersion or (inkjet) ink preferably includes the co-initiator in an amount of 0.1 to 50 wt %, more preferably in an amount of 0.5 to 25 wt %, most preferably in an amount of 1 to 10 wt % of the total weight of the ink.

Polymerization Inhibitors

The curable (inkjet) ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total pigment dispersion or (inkjet) ink.

Binders

Non-aqueous pigment dispersions and (inkjet) inks based on organic solvents or oils preferably include a binder resin. The binder functions as a viscosity controlling agent and also provides fixability relative to a polymeric resin substrate, e.g. a polyvinyl chloride substrate, also called vinyl substrate. The binder must be selected to have a good solubility in the solvents or oils.

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in a pigment dispersion or (inkjet) ink is preferably in the range of 0.1 to 30 wt %, more preferably 1 to 20 wt %, most preferably 2 to 10 wt % based on the total weight of the pigment dispersion or (inkjet) ink.

Surfactants

The pigment dispersion or (inkjet) ink may contain at least one surfactant. The surfactant(s) can be anionic, cationic, non-ionic, or zwitter-ionic and are usually added in a total quantity less than 20 wt %, preferably in a total quantity less than 3 wt % based on the total weight of the pigment dispersion or (inkjet) ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous (inkjet) inks preferred surfactants are preferably selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable (inkjet) ink a fluorinated or silicone compound may be used as a surfactant, but preferably a polymerizable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of Pigment Dispersions and Inks

Pigment dispersions may be prepared by mixing and/or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Suitable milling media includes glasses, ceramics, metals, and plastics. In a preferred embodiment, the grinding media can comprise particles, preferably substantially spherical in shape, e.g. beads consisting essentially of a polymeric resin or yttrium stabilized zirconium beads.

Each process in the dispersion process is preferably performed with cooling to prevent build up of heat, and for radiation curable pigment dispersions as much as possible under light conditions in which actinic radiation has been substantially excluded.

The pigment dispersion may contain more than one pigment. The pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary depending upon the specific materials and the intended applications. The contents of the milling mixture comprise the mill grind and the milling media. The mill grind includes pigment, dispersant and a liquid carrier. For (inkjet) inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention pigment dispersions with an average particle size of less than 100 nm may be prepared.

After milling is completed, the milling media is preferably separated from the milled particulate product (in either a dry or liquid dispersion form) using conventional separation techniques, such as by filtration, sieving through a mesh screen, and the like. Often the sieve is built into the mill, e.g. a bead mill. The milled pigment concentrate is preferably separated from the milling media by filtration.

In general it is desirable to make (inkjet) inks in the form of a concentrated mill grind, which is subsequently diluted to the appropriate concentration for use in e.g. the inkjet printing system. This technique permits preparation of a greater quantity of pigmented ink from the equipment. By dilution, the (inkjet) ink is adjusted to the desired viscosity, surface tension, colour, hue, saturation density, and print area coverage for the particular application.

Spectral Separation Factor

The spectral separation factor SSF was found to be an excellent measure to characterize a pigmented (inkjet) ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design (inkjet) ink sets with large colour gamut. Often (inkjet) ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these (inkjet) ink sets is low or mediocre.

EXAMPLES

Materials

All materials used in the following examples were readily available from standard sources such as ALDRICH CHEMICAL Co. (Belgium) and ACROS (Belgium) unless otherwise specified. The water used was deionized water.

PR122 is Ink Jet Magenta EO2VP2621 which is C.I. Pigment Red 122 available from CLARIANT.

PQMIX is Chromophtal™ Magenta 2BC which is a mixed crystal of C.I Pugemnt Violet 19 and C.I Pigment Red 202 available from CIBA.

PV23 is PV Fast Violet RL which is C.I. Pigment Violet 23 available from CLARIANT.

PO71 is Chromophtal™ DPP Orange TR which is C.I. Pigment Orange 71 available from CIBA.

PR177 is Chromophtal™ Red A2B which is C.I. Pigment Red 177 available from CIBA.

PV19 is the abbreviation for C.I. Pigment Violet 19 for which Hostaperm Red™ E5BO2 from CLARIANT was used.

DB162 is the polymeric dispersant Disperbyk™ 162 available from BYK CHEMIE GMBH whereof the solvent mixture of 2-methoxy-1-methylethylacetate, xylene and n-butylacetate was removed.

S39000 is Solsperse™ 39000 which is a polyethyleneimine core grafted with polyester-hyperdispersant from LUBRIZOL.

DEGDEE is diethylene glycol diethyl ether.

SYN-1 is a quinacridone dispersion synergist according to formula SYN-1:

Formula SYN-1

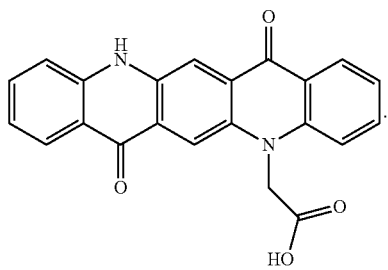

The dispersion synergist SYN-1 was prepared as follows.

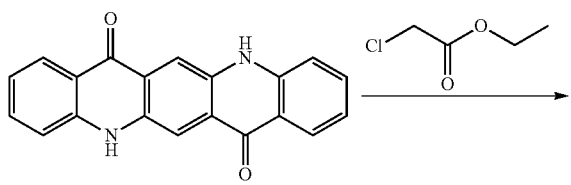

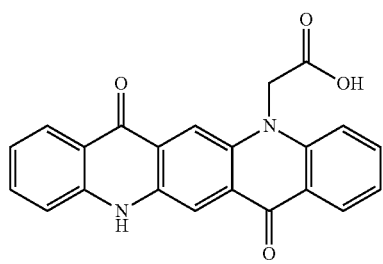

A RBF was charged with quinacridone PV19 (250 g, 0.8 mol), DMSO (1.6 L) and potassium tert-butoxide (179 g, 1.6 mol) and stirred upon heating to 70° C. KI (30 g, 0.18 mol) was added to the mixture which was further stirred for 0.5 h at this temperature. Ethylchloroacetate (98 g, 0.8 mol) was then added to the solution over a period of 0.5 h via a dropping funnel. The mixture was stirred at 70-75° C. for an additional 3 h. KOH (135 g, 2.4 mol) was added to the reaction mixture which was further stirred for 1 h at 80° C. prior to the addition of water (0.6 L) and an additional stirring for 0.5 h. At last, HCl 37% (720 g, 6 mol) was carefully added to the solution which was cooled down to room temperature, washed with water until reaching pH 4 and dried in a dry oven, at 60° C.

SYN-2 is a quinacridone dispersion synergist prepared according to the synthesis method disclosed for QAD-3 in paragraphs [0231]-[0233] of WO 2007/060259 (AGFA):

Formula SYN-2

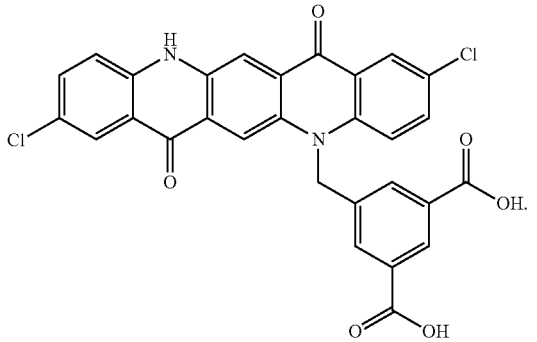

SYN-3 is a dispersion synergist according to Formula SYN-3:

Formula SYN-3

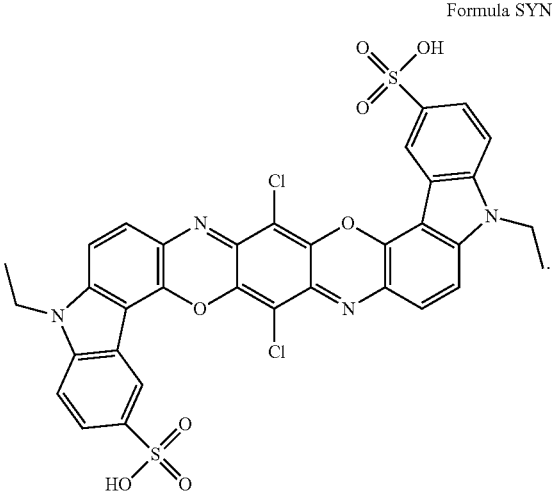

58.8 g (0.1 mol) of PV23 was dissolved and heated to 130° C. in 400 mL concentrate sulphuric acid. After 30 minutes the solution was cooled to room temperature and dropped into 2 L water. The precipitate was filtered off and washed with acetone. The yield of SYN-3 was 85%.

Measurement Methods

1. Measurement of SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

if the colour ink has a maximum absorbance $A_{max}$ between 400 and 500 nm then the absorbance $A_{ref}$ must be determined at a reference wavelength of 600 nm, If the colour ink has a maximum absorbance $A_{max}$ between 500 and 600 nm then the absorbance $A_{ref}$ must be determined at a reference wavelength of 650 nm, If the colour ink has a maximum absorbance $A_{max}$ between 600 and 700 nm then the absorbance $A_{ref}$ must be determined at a reference wavelength of 830 nm. For C.I. Pigment Violet 23 pigments, the absorbance $A_{ref}$ was determined at a reference wavelength of 730 nm.

The absorbance was determined in transmission with a Shimadzu UV-2101 PC double beam-spectrophotometer. The inks were diluted with ethyl acetate to have a pigment concentration of 0.002 wt % based on the total weight of the ink. Quinacridone containing pigments were measured at a dilution of 0.005 wt % based on the total weight of the ink due to their lower extinction.

A spectrophotometric measurement of the UV-VIS-NIR absorption spectrum of the diluted ink was performed in transmission-mode with a double beam-spectrophotometer using the settings of Table 1. Quartz cells with a path length of 10 mm were used and ethyl acetate was chosen as a blank.

TABLE 1

| Mode | Absorbance |
| --- | --- |
| Wavelength range | 240-900 nm |
| Slit width | 2.0 nm |
| Scan interval | 1.0 nm |
| Scan speed | Fast (1165 nm/min) |
| Detector | photo-multiplier(UV-VIS) |

Efficient pigmented (inkjet) inks exhibiting a narrow absorption spectrum and a high maximum absorbance have a value for SSF of at least 30, more preferably at least 60.

2. Average Particle Size

The particle size of pigment particles in inkjet ink was determined by photon correlation spectroscopy at a wavelength of 633 nm with a 4 mW HeNe laser on a diluted sample of the inkjet ink. The particle size analyzer used was a Malvern™ nano-S available from Goffin-Meyvis.

The sample was prepared by addition of one drop of ink to a cuvette containing 1.5 mL ethyl acetate and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is below 200 nm, preferably between 70 and 150 nm.

The inkjet ink is considered to be a stable pigment dispersion if the particle size remained below 200 nm after a heat treatment of 7 days at 80° C.

3. Pigment Dispersion Stability

The dispersion stability was evaluated by comparing the SSF before and after a heat treatment of one week at 80° C. Inkjet inks exhibiting good dispersion stability have a SSF after heat treatment still larger than 30. The % loss in SSF should preferably be as small as possible but is less critical for SSF values larger than 100.

Example 1

This example illustrates the surface modification of the quinacridone pigment C.I. Pigment Red 122.

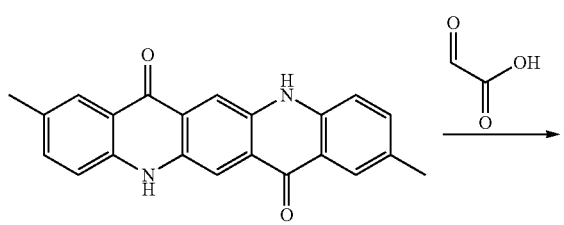

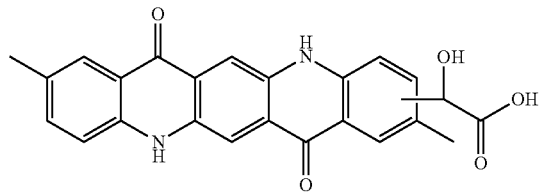

To a suspension of 5 g PR122 (15 mmol) in 50 mL toluene was added in one portion 2.4 mL of a 50% aqueous solution of glyoxylic acid (21 mmol). The reaction mixture was heated to reflux and stirred for 16 h. The mixture was allowed to cool down to 20° C. prior to the filtration. The solid residue was washed with toluene and acetone, and dried in a dry oven at 70° C. for 24 h. The dry solid PR122-MOD1 was obtained in about 80% yield and crushed prior to use for ink dispersion preparation.

Example 2

This example illustrates the surface modification of a mixed crystal of two quinacridones, i.e. C.I. Pigment Violet 19 and C.I. Pigment Red 202.

It is believed that the surface modification occurs mainly on C.I. Pigment Violet 19 surface molecules:

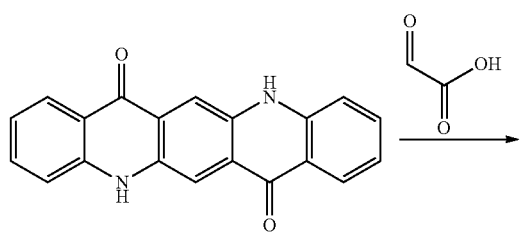

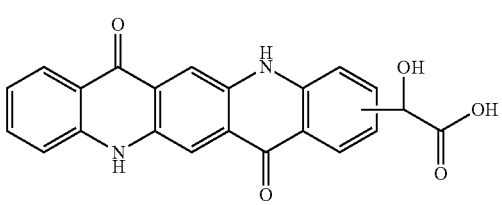

To a suspension of 5 g PQMIX (16 mmol) in 60 mL toluene was added in one portion 2.4 mL of a 50% aqueous solution of glyoxylic acid (21 mmol) and 2.5 g of pure $CH_3COOH$ (43 mmol). The reaction mixture was heated to reflux and stirred for 16 h. The mixture was allowed to cool down to 20° C. prior to the filtration. The solid residue PQMIX-MOD1 was washed with toluene and acetone, and dried in a dry oven at 70° C. for 24 hours. The dry solid PQMIX-MOD1 was obtained in about 80% yield and crushed prior to use for ink dispersion preparation.

Example 3

This example illustrates different methods for the surface modification of the diindolotriphenodioxazine pigment C.I. Pigment Violet 23.

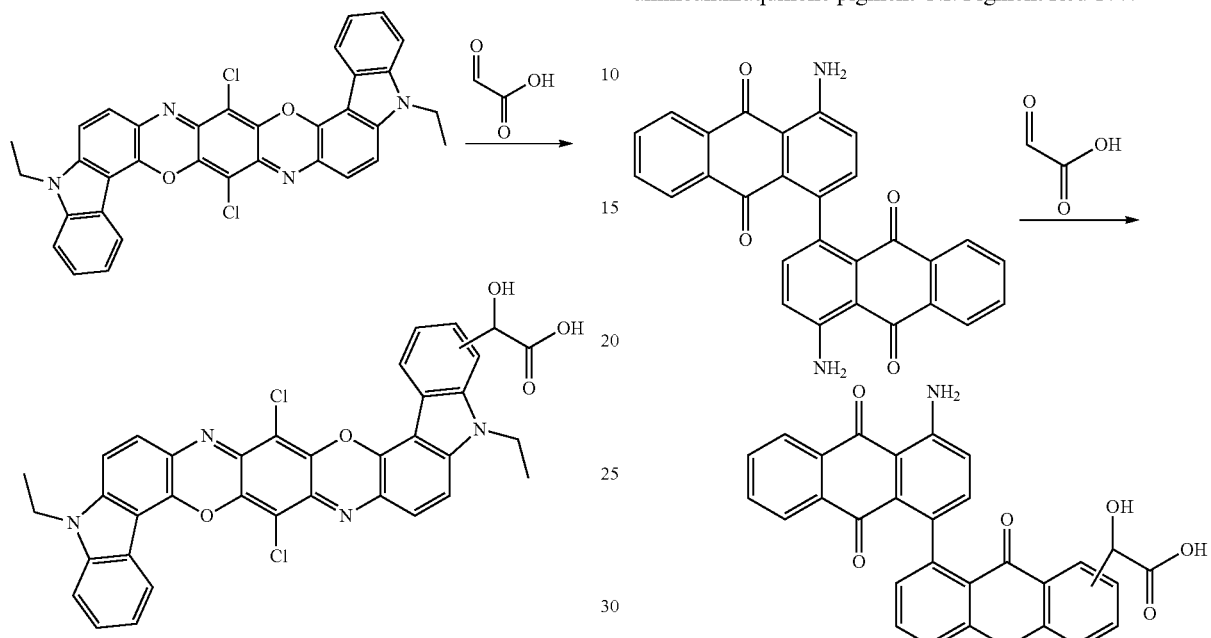

First method: to a suspension of 200 g of PV23 (0.34 mol) in 1.4 L toluene was added in one portion 20 g of glyoxylic acid in its monohydrate form (0.21 mol) and 5 mL HCl 37% (0.06 mol). The reaction mixture was heated to reflux and stirred for 6 h. The mixture was allowed to cool down to 20° C. and water was then removed through partial distillation (about 15% of the reaction's volume). The mixture was filtrated, washed with toluene and acetone, and dried in a dry oven at 70° C. for 24 h. The dry solid PV23-MOD1 was obtained in quantitative yield.

Second method: to a suspension of 200 g of PV23 (200 g, 0.34 mol) in 1.4 L toluene was added in one portion 24 mL of a 50% aqueous solution of glyoxylic acid (0.21 mol) and 5 mL of HCl 37% (0.06 mol). The reaction mixture was heated to reflux and stirred for 6 h. The mixture was allowed to cool down to 20° C. and water was then removed through partial distillation (about 15% of the reaction's volume). The mixture was filtrated, washed with toluene and acetone, and dried in a dry oven at 70° C. for 24 h. The dry solid PV23-MOD2 was obtained in quantitative yield and directly used for ink dispersion preparation.

Third method: to a suspension of 5 g of PV23 (8.5 mmol) in 35 mL toluene was added in one portion 0.5 g of glyoxylic acid in its monohydrate form (5 mmol) and 0.1 g of MeSO₃H (1 mmol). The reaction mixture was heated to reflux and stirred for 4 h. The mixture was allowed to cool down to 20° C., filtrated and washed with toluene. The solid was dried in a dry oven at 70° C. for 24 h. The dry solid PV23-MOD3 was obtained in about 80% yield.

Fourth method: to a suspension of 5 g of PV23 (8.5 mmol) in 35 mL toluene was added in one portion 0.6 mL of a 50% aqueous solution of glyoxylic acid (5 mmol) and 0.1 g of MeSO₃H (1 mmol). The reaction mixture was heated to reflux and stirred for 4 h. The mixture was allowed to cool down to 20° C., filtrated and washed with toluene. The solid was dried in a dry oven at 70° C. for 24 h. The dry solid PV23-MOD4 was obtained in about 80% yield.

Example 4

This example illustrates the surface modification of the aminoanthraquinone pigment C.I. Pigment Red 177.

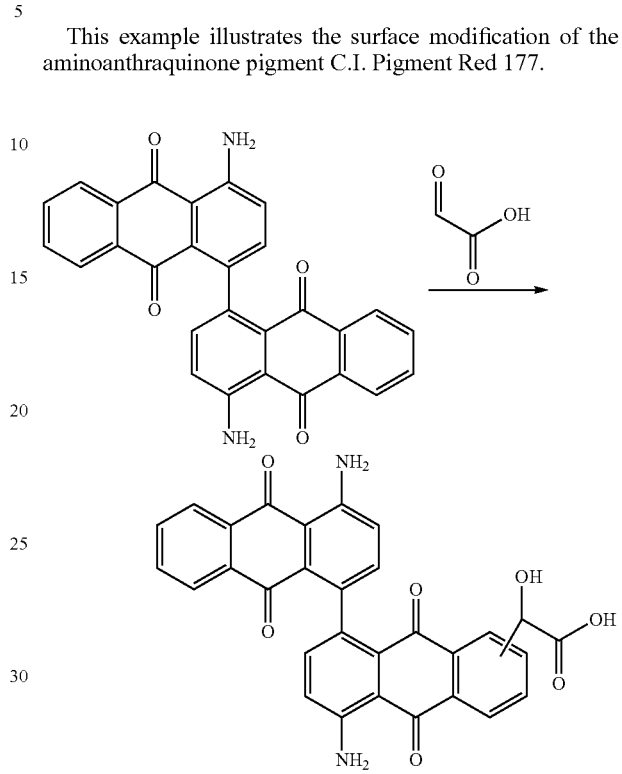

To a suspension of 5 g PR177 (15 mmol) in 50 mL toluene was added in one portion 1.8 mL of an 50% aqueous solution of glyoxylic acid (15.8 mmol). The reaction mixture was heated to reflux and stirred for 16 h. The mixture was allowed to cool down to 20° C. prior to the filtration. The solid residue was washed with toluene and acetone, and dried in a dry oven at 70° C. for 24 h. The dry solid PR177-MOD1 was obtained in about 80% yield.

Example 5

This example illustrates different methods for the surface modification of the diketopyrrolopyrrole pigment C.I. Pigment Orange 71.

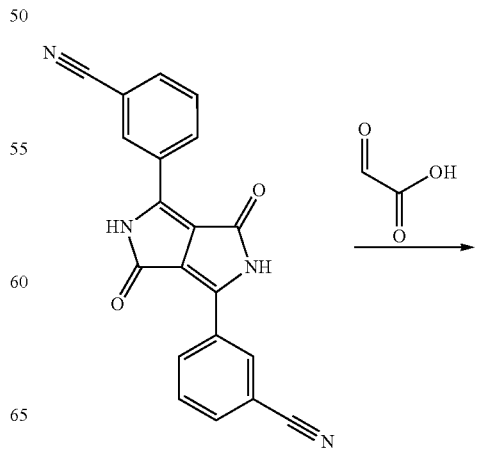

-continued

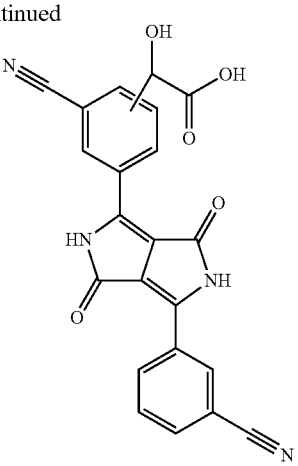

First method: to a suspension of 5 g of PO71 (14.8 mmol) in 35 mL toluene was added in one portion 0.9 g of glyoxylic acid in its monohydrate form (8.7 mmol) and 0.1 g of MeSO$_3$H (1 mmol). The reaction mixture was heated to reflux and stirred for 4 h. The mixture was allowed to cool down to 20° C., filtrated and washed with toluene. The solid was dried in a dry oven at 70° C. for 24 h. The dry solid PO71-MOD1 was obtained in about 80% yield and was directly used for ink dispersion preparation.

Second method: to a suspension of 5 g of PO71 (14.8 mmol) in 35 mL toluene was added in one portion 1.0 mL of a 50% aqueous solution of glyoxylic acid (8.7 mmol) and 0.1 g of MeSO$_3$H (1 mmol). The reaction mixture was heated to reflux and stirred for 4 h. The mixture was allowed to cool down to 20° C., filtrated and washed with toluene. The solid was dried in a dry oven at 70° C. for 24 h. The dry solid PO71-MOD2 was obtained in 80% yield and was directly used for ink dispersion preparation.

Third method: to a suspension of 200 g of PO71 (0.59 mol) in 1.4 L toluene was added in one portion 35 g of glyoxylic acid in its monohydrate form (0.37 mol) and 5 mL of HCl 37% (0.06 mol). The reaction mixture was heated to reflux and stirred for 6 h. The mixture was allowed to cool down to 20° C. and water was then removed through partial distillation (about 15% of the reaction's volume). The mixture was filtrated, washed with toluene and acetone, and dried in a dry oven at 70° C. for 24 h. The dry solid PO71-MOD3 was obtained in quantitative yield and directly used for ink dispersion preparation.

Fourth method: to a suspension of 200 g of PO71 (0.59 mol) in 1.4 L toluene was added in one portion 42 mL of a 50% aqueous solution of glyoxylic acid (0.37 mol) and 5 mL of HCl 37% (0.06 mol). The reaction mixture was heated to reflux and stirred for 6 h. The mixture was allowed to cool down to 20° C. and water was then removed through partial distillation (about 15% of the reaction's volume). The mixture was filtrated, washed with toluene and acetone, and dried in a dry oven at 70° C. for 24 h. The dry solid PO71-MOD4 was obtained in quantitative yield and directly used for ink dispersion preparation.

Verification of Surface Modification

The efficiency of performing the surface modification was estimated via a "quick phase coloration test". Quick phase coloration test procedure: a 0.6 mL sample reaction mixture is put on a porous flagstone so that it creates a 4 cm diameter circle on it. The residue was then successively washed with 2 mL acetone, 2 mL MeOH and 2 mL distillate water. The wet residue was neither allowed to dry between the successive washing, nor after the last washing step. When the water from the last washing step had well penetrated the porous flagstone, a test tube (A tube) was charged with 3 to 5 mg of the wet residue and 5.5 mL distillate water. The mixture of the A tube was ultrasonicated (Sonics Vibra, 60 sec., maximum power, metal ultrasonicating bar 1.5 cm deep in the tube). To a B tube containing 4 mL of a 0.2% NaHCO$_3$ solution in water were added 2-3 drops of the A tube solution, to reach an 80% optical density at 566 nm. At last, 0.75 mL of CH$_2$Cl$_2$ was added to the B tube solution. The B tube was equipped with a stopper and shacked for 40 seconds (180 Hz, 15 cm amplitude). The B tube was left at rest for phase separation.

Before the surface modification, no coloration of the aqueous phase was observed for the pigments PR122, PQMIX, PV23, PO71 and PR177. After surface modification each of the surface modified pigments PR122-MOD1, PQMIX-MOD1, PV23-MOD1 to PV23-MOD4, PO71-MOD1 to PO71-MOD3 and PR177-MOD1 exhibited a coloration of the aqueous phase corresponding with the colour of the pigment.

Example 6

This example illustrates the dispersion quality and stability of the surface modified pigments in a non-aqueous inkjet ink based on the organic solvent DEGDEE.

Preparation and Evaluation of Inkjet Inks

All inkjet inks were prepared in the same manner to obtain a composition A or B as described in Table 2, depending on whether or not a dispersion synergist was used.

TABLE 2

| wt % of component | Composition A | Composition B |
| --- | --- | --- |
| Pigment | 5.00 | 4.50 |
| Dispersion synergist | | 0.50 |
| Polymeric dispersant | 5.00 | 5.00 |
| DEGDEE | 90.00 | 90.00 |

An inkjet ink was made by mixing the pigment, the polymeric dispersant, optionally the dispersion synergist, and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

In accordance with the procedure described in the previous paragraph, the comparative inkjet inks COMP-1 to COMP-11 and the inventive inkjet inks INV-1 to INV-11 were prepared according to Table 3.

TABLE 3

| Inkjet ink | Pigment | Dispersion synergist | Polymeric Dispersant |
| --- | --- | --- | --- |
| COMP-1 | PR177 | no | S39000 |
| COMP-2 | PR177 | no | DB162 |
| COMP-3 | PR122 | no | DB162 |
| COMP-4 | PR122 | SYN-1 | DB162 |

TABLE 3-continued

| Inkjet ink | Pigment | Dispersion synergist | Polymeric Dispersant |
|---|---|---|---|
| COMP-5 | PQMIX | no | DB162 |
| COMP-6 | PQMIX | no | S39000 |
| COMP-7 | PQMIX | SYN-2 | S39000 |
| COMP-8 | PO71 | no | DB162 |
| COMP-9 | PV23 | no | DB162 |
| COMP-10 | PV23 | no | S39000 |
| COMP-11 | PV23 | SYN-3 | S39000 |
| INV-1 | PR177-MOD | no | S39000 |
| INV-2 | PR177-MOD | no | DB162 |
| INV-3 | PR122-MOD1 | no | DB162 |
| INV-4 | PQMIX-MOD1 | no | DB162 |
| INV-5 | PQMIX-MOD1 | no | S39000 |
| INV-6 | PO71-MOD1 | no | DB162 |
| INV-7 | PO71-MOD2 | no | DB162 |
| INV-8 | PO71-MOD3 | no | DB162 |
| INV-9 | PO71-MOD4 | no | DB162 |
| INV-10 | PV23-MOD2 | no | DB162 |
| INV-11 | PV23-MOD2 | no | S39000 |

The average particle size and the spectral separation factor SSF were determined to evaluate the dispersion quality and were determined again after a heat treatment of 1 week at 80° C. The results are also listed in Table 4.

TABLE 4

| | Dispersion quality & stability | | | |
|---|---|---|---|---|
| | After preparation | | After heat treatment | |
| Inkjet ink | SSF | Size (nm) | % Loss in SSF | Size (nm) |
| COMP-1 | 5 | 974 | 0% | 968 |
| COMP-2 | 14 | 383 | 7% | 608 |
| COMP-3 | 22 | 508 | 9% | 540 |
| COMP-4 | 96 | 127 | 67% | 324 |
| COMP-5 | 99 | 84 | 67% | 242 |
| COMP-6 | 76 | 102 | 55% | 227 |
| COMP-7 | 134 | 72 | 4% | 74 |
| COMP-8 | 75 | 204 | 31% | 286 |
| COMP-9 | 9 | 1260 | Not measureable | Not measureable |
| COMP-10 | 7 | 1510 | Not measureable | Not measureable |
| COMP-11 | 15 | 941 | 0% | 357 |
| INV-1 | 63 | 106 | 0% | 96 |
| INV-2 | 94 | 77 | 0% | 74 |
| INV-3 | 103 | 96 | 69% | 181 |
| INV-4 | 130 | 54 | 5% | 54 |
| INV-5 | 118 | 71 | 13% | 70 |
| INV-6 | 187 | 76 | 45% | 114 |
| INV-7 | 152 | 77 | 0% | 73 |
| INV-8 | 300 | 73 | 19% | 68 |
| INV-9 | 178 | 72 | 0% | 73 |
| INV-10 | 157 | 90 | 30% | 90 |
| INV-11 | 121 | 94 | 16% | 98 |

From Table 4, it should be clear that inkjet inks INV-1 to INV-11 using surface modified pigments exhibited improved dispersion quality and stability. For none of these inks, a particle size larger than 200 nm was observed after heat treatment, which is important to guarantee continuous printing without production loss due to nozzle or engine failures.

Although a substantial loss in SSF was observed for the quinacridone pigment PR122 in inkjet ink INV-3, there was no gelation or flocculation observed as was the case for the comparative inks COMP-3 and COMP-4. For the comparative inks COMP-9 and COMP-10, the flocculation was even so severe that measurement of SSF and average particle size became impossible.

The good results of comparative inkjet ink COMP-7 are due to the addition of a dispersion synergist having a certain molecular similarity with the pigment PQMIX. This development of a specific dispersion synergist for each pigment class leads to high additional cost and is economically less attractive.

Example 7

This example illustrates the compatability of the surface modified organic pigments according to the present invention with polymerizable compounds having at least one vinyl ether group in electron beam curable inkjet inks.

Preparation of Sulfonated Pigment SPV23

A mixture of 50 g of the pigment PV23, 380 mL acetonitrile and 2.5 g sulfuric acid is placed in a vessel open only at the top. This vessel is connected to a Liebig condenser and the mixture is refluxed for 8 hours at 80° C. reaction temperature. The mixture is then cooled to 20° C. and filtered. The filtrate was washed with water until a pH of 5 was reached by the filtrate. The filtrate was dried overnight at 40° C. in a vacuum oven. 47 g of a violet powder of the pigment SPV23 were recovered.

Preparation and Evaluation of Inkjet Inks

The inkjet inks COMP-12, INV-12 and INV-13 were prepared in the same manner to obtain a composition as described in Table 5.

TABLE 5

| wt % of component | Comp-12 | INV-12 | INV-13 |
|---|---|---|---|
| Sulfonated Pigment SPV23 | 5.00 | — | — |
| Carboxylated pigment PV23-MOD1 | — | 5.00 | — |
| Carboxylated pigment PV23-MOD3 | — | — | 5.00 |
| Polymeric dispersant DB162 | 5.00 | 5.00 | 5.00 |
| VEEA | 90.00 | 90.00 | 90.00 |

An inkjet ink was made by mixing the pigment, the polymeric dispersant DB162 and the polymerizable monomer VEEA with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth The average particle size and the spectral separation factor SSF were determined to evaluate the dispersion quality and were determined again after a heat treatment of 1 week at 60° C. The results are shown in Table 6.

TABLE 6

| | Dispersion quality & stability | | | |
|---|---|---|---|---|
| | After preparation | | After heat treatment | |
| Inkjet ink | SSF | Size (nm) | SSF | Size (nm) |
| COMP-12 | 32 | 108 | Flocculated | |
| INV-12 | 59 | 96 | 57 | 98 |
| INV-13 | 77 | 107 | 71 | 104 |

On mixing the components of the comparative inkjet ink COMP-12, a large temperature increase was observed, which is believed to be indicative for reaction with the vinylether group of VEEA. After a milder heat treatment of 1 week at only 60° C., complete flocculation and large agglomerates were observed for the comparative inkjet ink COMP-12. Table 6 shows that the heat treatment had no effect on the excellent dispersion quality of the inventive inkjet inks INV-12 and INV-13

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for preparing a surface modified organic pigment, the method comprising the steps of:
   reacting an organic pigment in an aromatic hydrocarbon solvent with a surface modifying reagent to form the surface modified organic pigment; and
   washing and drying the surface modified organic pigment; wherein
   the surface modifying reagent is represented by Formula (I):

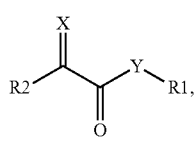

Formula (I)

X is selected from the group consisting of O, S, and N—R3;
   Y is selected from the group consisting of O and NR4;
   R1 to R4 are each independently selected from the group consisting of hydrogen, an alkyl group, an alkenyl group, an alkynyl group, an aralkyl group, an alkaryl group, and an aryl group and a heteroaryl group; and
   when Y—R1 is different from OH, at least one of R2 to R4 is substituted by at least one functional group having a pKa between 2.5 and 9.

2. The method according to claim 1, wherein the surface modifying reagent is represented by Formula (II):

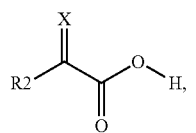

Formula (II)

wherein R2 is defined in Formula (I).

3. The method according to claim 1, wherein X represents O.

4. The method according to claim 1, wherein R2 is selected from the group consisting of hydrogen, an alkyl group, and an aryl group.

5. The method according to claim 1, wherein the surface modifying reagent is selected from the group consisting of glyoxylic acid, pyruvic acid, 2-oxobutanoic acid, and phenyl glyoxylic acid.

6. The method according to claim 1, wherein the organic pigment is selected from the group consisting of quinacridone pigments, diketopyrrolopyrrole pigments, quinolonoquinolone pigments, dioxazine pigments, aminoanthraquinone pigments, indanthrone pigments, bisbenzimidazobenzophenanthroline dione pigments, and mixed crystals thereof.

7. A surface modified organic pigment comprising:
   at least one functional group according to Formula (I) attached to its surface:

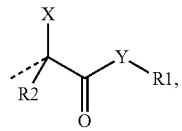

Formula (I)

wherein
   the dashed line in Formula I represents a covalent bond to one pigment molecule at a pigment surface;
   X is selected from the group consisting of OR5, SR6, NR3R7, and a halogen;
   Y is selected from the group consisting of O and NR4;
   R1 to R4 are independently selected from the group consisting of hydrogen, an alkyl group, an alkenyl group, an alkynyl group, an aralkyl group, an alkaryl group, an aryl group, and a heteroaryl group;
   R5 to R7 are independently selected from the group consisting of hydrogen, an alkyl group, an alkenyl group, an alkynyl group, an aralkyl group, an alkaryl group, an aryl group, and a heteroaryl group and an acyl group;
   any one of R1 to R7 may represent necessary atoms to form a five to eight membered ring with one of the other groups selected from R1 to R7; and
   when Y—R1 is different from OH, at least one of R2 to R7 is substituted by at least one functional group having a pKa between 2.5 and 9.

8. The surface modified organic pigment according to claim 7, wherein Y represents O, and R1 is hydrogen.

9. The surface modified organic pigment according to claim 7, wherein X is a hydroxyl group.

10. The surface modified organic pigment according to claim 7, wherein R2 is selected from the group consisting of hydrogen, an alkyl group, and an aryl group.

11. The surface modified organic pigment according to claim 7, wherein the one of pigment molecule at the pigment surface is selected from the group consisting of quinacridone, diketopyrrolopyrrole, quinolonoquinolone, dioxazine, aminoanthraquinone, indanthrone, and bisbenzimidazobenzophenanthroline dione.

12. A non-aqueous ink containing a surface modified organic pigment according to claim 7.

13. The non-aqueous ink according to claim 12, wherein the non-aqueous ink is a radiation curable ink.

14. The non-aqueous ink according to claim 13, further comprising a polymerizable compound including at least one vinyl ether group that is a vinyl ether acrylate.

15. The non-aqueous ink claim 12, wherein the non-aqueous ink is a non-aqueous inkjet ink.

* * * * *